Oct. 24, 1933.  H. H. SEMMES  1,932,285

BRAKE TESTING APPARATUS

Filed Dec. 22, 1930

Inventor

HARRY H. SEMMES

By Semmes and Semmes

Attorneys

Patented Oct. 24, 1933

1,932,285

UNITED STATES PATENT OFFICE 1,932,285

BRAKE TESTING APPARATUS

Harry H. Semmes, Chevy Chase, Md., assignor to Bendix-Cowdrey Brake Tester, Inc., South Bend, Ind., a corporation of Delaware Application December 22, 1930
Serial No. 504,112

4 Claims. (Cl. 73—51)

This invention relates to the testing of brakes, especially the brakes of automobiles and similar vehicles, and is illustrated as embodied in testing mechanism of the type in which an automobile is supported by its road wheels and the wheels are turned against the resistance of their brakes. In one form of such a machine, an inertia mass, such as a fly wheel, is run up to a predetermined speed and is then employed to drive any desired group of wheels against their brake resistance, thus simulating the inertia effect of the car on the road in continuing its motion after the brakes are applied.

An object of the invention is to provide for simulating the inertia effect of cars of different weights, by varying or adjusting the inertia effect of the wheel-driving mass, for example, by varying the moment of inertia of the fly wheel or an equivalent rotatable member. Preferably this is done by adjusting radially of the fly wheel a series of symmetrically-arranged weights.

A further object of the invention is to provide means for testing any desired group of wheels of the vehicle tested, such as the rear wheels, front wheels, left front wheel and right rear wheel, right front wheel and left rear wheel, the wheels on the left of the vehicle, or the wheels on the right of the vehicle. The braking effect of the pairs of wheels just enumerated is particularly important when the braking system is partially disabled. Such partial derangement of the braking system may leave only the rear wheels, the front wheels, the right front wheel and left rear wheel, or the left front wheel and right rear wheel effective. Moreover, if the wheels on one side of the car are on a slippery surface, only the brakes on the wheels of the other side will be effective. The brake tester herein disclosed is particularly suitable for testing the brakes on such sets of wheels, in simulation of the braking effect of a partially deranged braking system.

The above and other objects and features of the invention, including a novel fly wheel construction and other desirable structural features, will be apparent from the following description of one illustrative embodiment shown in the accompanying drawing, in which.

Figure 1:
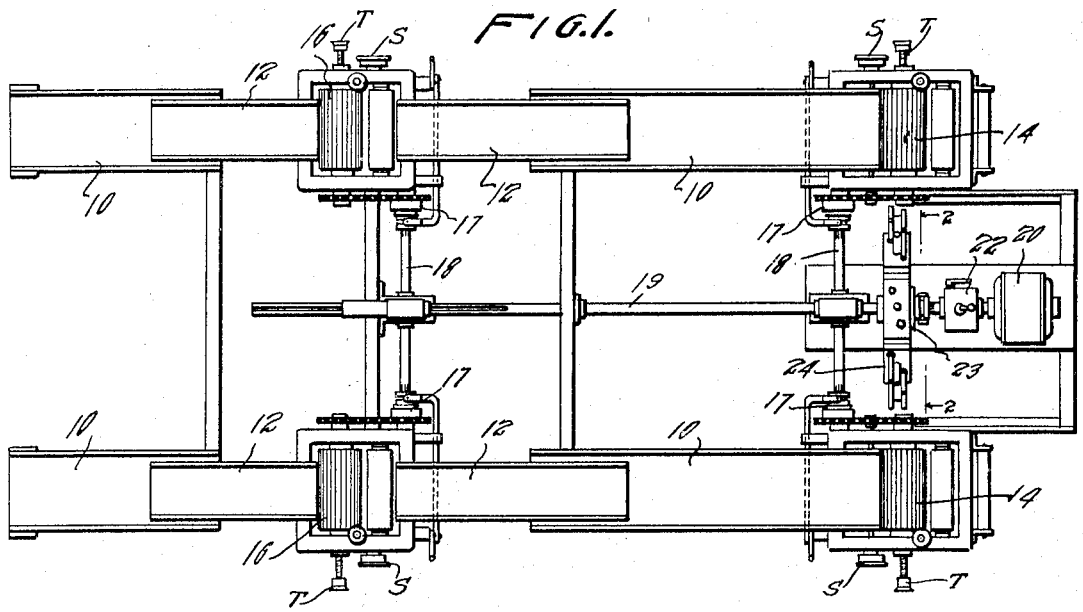
Figure 1 is a top plan view of the apparatus.

The apparatus of Figure 1, except for the addition of my improvements as described below, may be and is shown as being the same as fully described and claimed in application No. 276,294, filed May 9, 1928, by Furber I. Marshall. This apparatus includes stationary wheel tracks 10, and a movably adjustable carriage having tracks 12, so that an automobile may be run onto the machine under its own power. There are two rolls 14 for supporting and driving the front wheels and which are mounted in the framework of the machine, and two rolls 16 for supporting and driving the rear wheels and which are mounted on the adjustable carriage between the tracks 12.

Rolls 14 and 16, and therefore the wheels of the automobile, are driven through clutches 17 and suitable shafting 18 and 19, or the like from an electric motor 20 acting through a change-speed gear 22 and a clutch 23 cooperating with a novel fly wheel 24 more fully described below. Adjacent each roll is a force-measuring device S through which the shafting 18 drives the corresponding roll 14 or 16, and which serves to measure the resistance of the corresponding one of the brakes when the motor is driving the rolls at low speed.

After the individal effectiveness of the brakes has been checked in this manner, and any necessary adjustments made, it is the intention to shift gearing 22 into high speed position and speed up the wheels and fly wheel 24 to a known speed equivalent to a road speed of say twenty or thirty miles an hour, and then test the stopping ability of the car (i. e., the effectiveness of the entire braking system) by simultaneously applying the brakes and throwing out the clutch 23 and then measuring by means such as a counter T the number of rotations of the wheels before the braking resistance overcomes the inertia of the fly wheel 24 and brings the road wheels and rolls 14 and 16 to rest. This result is readily convertible into linear feet of stopping distance at the speed used.

It will be observed that the effect of the momentum of the car which is overcome by the braking resistance in stopping on the road is here simulated by the moment of inertia of fly wheel 24. According to an important feature of the invention, this moment of inertia is made adjustable to simulate the inertia effect of cars of different weights.

The provision of the clutches 17 provides for a selective testing of any desired group of wheels, to simulate the braking effect of a partially disabled braking system. Usually such groups will consist of pairs of wheels, though of course any three of the wheels, or any single wheel may be so tested. The method of testing such groups of weights is substantially similar to that of testing all four wheels described in the two preceding paragraphs, except that the clutches 17 connected to the rolls 14 or 16 driving the wheels it is not desired to test, are thrown out.

Thus, if it is desired to test the rear wheels only, the clutches 17 communicating with the rolls 14 are thrown out.

Figure 2:
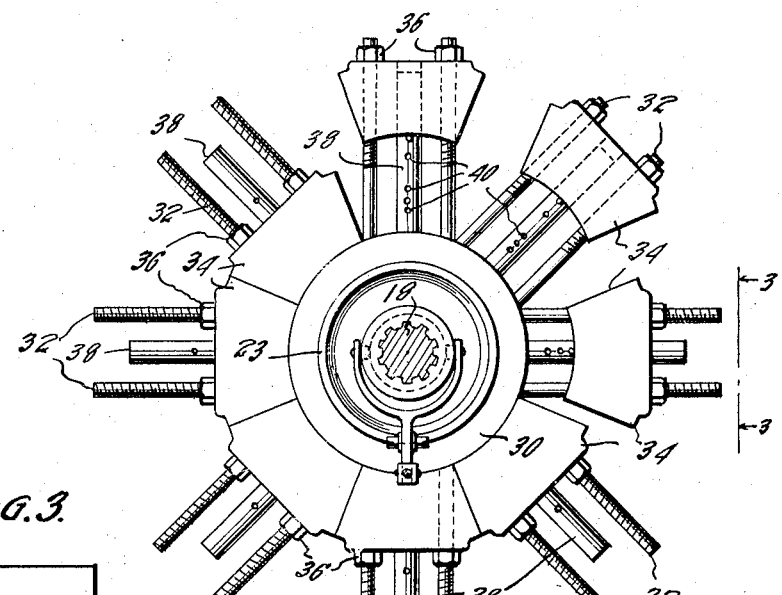
Figure 2 is a section on the line 2—2 of Figure 1, showing the novel fly wheel.
Figure 3:
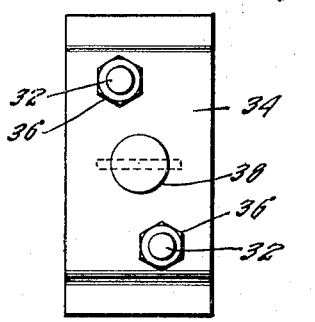
Figure 3 is a partial elevation looking in the direction of the arrows 3—3 in Figure 2, and showing the mounting of one of the weights.

As best shown in Figure 2, the fly wheel 24 may include a solid central portion 30 connected by clutch 23 to the shafting 18, and on which are radial pairs of threaded parallel studs 32 symmetrically arranged about the axis of the fly wheel. On each pair of studs there may be radially slidably arranged a weight 34 held by centrifugal force against stops such as nuts 36 threaded on studs 32.

Weights 34 are shown at different radial distances to illustrate how the moment of inertia of the fly wheel may be changed, but of course in the operation of the machine they will all be in the same radial position so that the fly wheel as a whole is dynamically balanced. I prefer to provide central openings in the weights for radial members 38 provided with scales 40 for setting the weights, and which may be calibrated to show the positions for different cars. In use, as will be seen, weights 34 are adjusted radially outward for the heavier cars and inward for the lighter cars, thus enabling such an adjustment that the moment of inertia of fly wheel 24 may be the equivalent of the linear inertia of a car of any weight at a corresponding road speed.

While one illustrative embodiment has been described in detail, it is not my intention to limit the scope of the invention to that particular embodiment, or otherwise than by the terms of the appended claims.

I claim:

1. Brake-testing mechanism comprising, in combination, a plurality of means through which the wheels of a vehicle may be turned against the resistance of its brakes, a common inertia means for operating the wheel-turning means, and means for selectively connecting the inertia means to the one or more wheel turning means.

2. Brake-testing mechanism comprising, in combination, a plurality of means through which the wheels of a vehicle may be turned against the resistance of its brakes, a common inertia means for operating the wheel-turning means, means for selectively connecting the inertia means to the one or more wheel-turning means, and means for varying the moment of inertia of the inertia means.

3. A brake-testing mechanism comprising, a plurality of devices each constructed and arranged to turn one wheel against the resistance of its brake, a fly wheel, and connections between said fly wheel and said devices including a clutch associated with each wheel turning device whereby said fly wheel may be caused to selectively operate one or more of said wheel-turning devices.

4. A brake-testing mechanism comprising, a plurality of devices each constructed and arranged to turn one wheel against the resistance of its brake, a fly wheel, and connections between said fly wheel and said devices including an independently operable clutch associated with each wheel-turning device.

HARRY H. SEMMES.